UNITED STATES PATENT OFFICE.

EDWIN EUSTON, OF ST. LOUIS, MISSOURI, ASSIGNOR TO EUSTON LEAD COMPANY, OF ST. LOUIS, MISSOURI, A CORPORATION OF MISSOURI.

PROCESS OF MAKING BASIC CARBONATES OF LEAD.

1,117,358.      Specification of Letters Patent.      Patented Nov. 17, 1914.

No Drawing.      Application filed November 2, 1911. Serial No. 658,145.

*To all whom it may concern:*

Be it known that I, EDWIN EUSTON, a citizen of the United States, residing at St. Louis, Missouri, have invented a certain new and useful Improvement in Processes of Making Basic Carbonates of Lead, of which the following is a full, clear, and exact description, such as will enable others skilled in the art to which it appertains to make and use the same.

This invention relates to the manufacture of white lead, and has for its object to provide a process by which bulky, unmerchantable, basic carbonate of lead containing less than two equivalents of lead carbonate to one equivalent of lead hydroxid in the molecule can be converted into dense white lead of excellent quality.

I have discovered that if basic carbonate of lead is precipitated from basic lead acetate solution by carbon dioxid gas, the precipitate first formed is bulky, flocculent and unmerchantable as a pigment, and that although further treatment with carbon dioxid gas eventually causes a marked increase in the actual density of the precipitate yet this occurs only after an excessive amount of carbon dioxid has become combined, thereby diminishing the opacity of the precipitate. I have further discovered that if, contrary to the known practice, the first formed precipitate mentioned above is separated from its solution while the solution is still basic, and is then mixed with lead acetate solution of acid reaction and uniformly treated with carbon dioxid gas, density of the product results from the addition of a lesser amount of carbon dioxid than if the original solution, while still basic, had not been removed and replaced by lead acetate solution of acid reaction before the further treatment with carbon dioxid gas.

My process consists in five steps: (First.) The precipitation of bulky, flocculent, basic lead carbonate (containing less than two equivalents of lead carbonate to one equivalent of lead hydroxid in the molecule) by the treatment of basic lead acetate solution with carbon dioxid gas in amount sufficient to precipitate only part of the basic portion of the lead in solution. (Second.) The removal of most of the mother solution while still basic. (Third.) The addition of lead acetate solution of acid reaction. (Fourth.) The uniform treatment of said precipitate and lead acetate solution of acid reaction with carbon dioxid gas until the desired density of the precipitate is attained. (Fifth.) The separation of the precipitate from the solution and preparation for the market in the known ways.

One convenient way of practising my improved process consists in treating basic lead acetate solution of specific gravity 1.16 with carbon dioxid gas, pure or dilute, at ordinary temperatures and at atmospheric pressure, in a suitable vessel provided with means for spraying the solution through the atmosphere of carbon dioxid gas in the upper portion of the vessel. This treatment is continued until part, but not all, of the basic lead is precipitated, as may be easily determined by the specific gravity of the solution. The liquid is then removed, completely or in greater part, from the precipitate by decantation or other means, and to the precititate is then added a sufficient amount of lead acetate solution of acid reaction to permit of thoroughly uniform treatment, and the precipitate then treated again with carbon dioxid gas in the apparatus described above, until a marked increase in the density of the precipitate occurs, as may be ascertained by increased rate of settling of test-portions, or by other convenient means.

I do not wish it to be understood that my process is limited to the use of any particular form or size of apparatus, to any special amount or strength of solutions, to the complete removal of the basic lead acetate solution in the second step of the process, to the use of pure carbon dioxid gas, nor to any special method of determining the density of the precipitate in the first and fourth steps, as these are not essential to my broad idea which consists in a process for making white lead characterized by, first, precipitating by carbon dioxid gas part, but not all, of the basic portion of a basic lead acetate solution; second, the separation of the greater portion of the said solution from the precipitate; third, the addition to the so-separated precipitate, of a sufficient amount of lead acetate solution of acid reaction to permit free movement of the particles; fourth, the treatment of the precipitate in the lead acetate solution of acid reaction with carbon dioxid; and, fifth, the separation of the precipitate from the solution, and preparation for the market in the known ways.

I claim:

A process of making white lead which consists in precipitating by carbon dioxid gas part, but not all, of the basic portion of a basic lead acetate solution, separating at least the greater part of the mother solution from the precipitate, adding lead acetate solution of acid reaction to the said precipitate, treating with carbon dioxid gas until the precipitate acquires density, and separating the precipitate from the solution and preparing for the market in any suitable way.

In testimony whereof I hereunto affix my signature in the presence of two witnesses, this thirtieth day of October 1911.

EDWIN EUSTON.

Witnesses:
 WELLS L. CHURCH,
 GEORGE BAKEWELL.